(12) United States Patent
Hong et al.

(10) Patent No.: US 9,197,370 B2
(45) Date of Patent: Nov. 24, 2015

(54) METHOD OF DETECTING PACKET ERROR OF RETURN LINK PERFORMED IN SATELLITE COMMUNICATION APPARATUS

(75) Inventors: Hyun Ha Hong, Seoul (KR); Deock Gil Oh, Daejeon (KR); Min Su Shin, Daejeon (KR); Man Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 599 days.

(21) Appl. No.: 13/596,628

(22) Filed: Aug. 28, 2012

(65) Prior Publication Data

US 2013/0051267 A1 Feb. 28, 2013

(30) Foreign Application Priority Data

Aug. 29, 2011 (KR) .......................... 10-2011-0086432

(51) Int. Cl.
*H04L 12/26* (2006.01)
*H04L 1/00* (2006.01)

(52) U.S. Cl.
CPC ............ *H04L 1/0083* (2013.01); *H04L 1/0061* (2013.01)

(58) Field of Classification Search
CPC .. H04B 7/18528; H04B 7/18534; H04L 1/16; H04L 2001/0092

USPC .................................................. 370/252, 216
See application file for complete search history.

(56) References Cited

U.S. PATENT DOCUMENTS

| 2008/0175247 | A1 | 7/2008 | Agarwal |
| 2008/0274690 | A1 | 11/2008 | Laufer |
| 2012/0159291 | A1 | 6/2012 | Hong et al. |
| 2012/0257492 | A1* | 10/2012 | Henry et al. .................. 370/216 |

FOREIGN PATENT DOCUMENTS

| KR | 10-2010-0017200 A | 2/2010 |
| KR | 10-2012-0070142 A | 6/2012 |

* cited by examiner

*Primary Examiner* — Dang Ton
*Assistant Examiner* — Lionel Preval
(74) *Attorney, Agent, or Firm* — William Park & Associates Ltd.

(57) ABSTRACT

Provided is a method of detecting a packet error of a return link performed in a satellite communication apparatus receiving a packet through the return link. The method includes generating a first return link packet combination by assembling at least one fragmented packet received through the return link, and determining an error of the packet using at least one piece of information among fragmentation information on at least one second return link packet received after the first return link packet combination is generated, whether or not the first return link packet combination is complete, and packet process state information. Accordingly, it is possible to minimize packet loss caused by a reassembly error of a received packet.

7 Claims, 6 Drawing Sheets

METHOD OF DETECTING PACKET ERROR OF RETURN LINK PERFORMED IN SATELLITE COMMUNICATION APPARATUS

CLAIM FOR PRIORITY

This application claims priority to Korean Patent Application No. 10-2011-0086432 filed on Aug. 29, 2011 in the Korean Intellectual Property Office (KIPO), the entire contents of which are hereby incorporated by reference.

BACKGROUND

1. Technical Field

Example embodiments of the present invention relate in general to a packet error detection method, and more particularly, to a method of detecting a packet error of a return link that is performed in a satellite communication apparatus and can be applied to detection of an error of a packet transmitted through a return link from a satellite terminal device to a central station.

2. Related Art

Due to a generational advance in mobile communication technology and the rapid development of high-speed Internet technology, it has become possible to readily use various information communication services including the Internet in a fixed or mobile environment. These days, users and service providers are increasingly demanding high-speed mobile communication services that can be provided at any time in any place without limitations of space. However, existing communication services based on ground networks cannot satisfy such demands due to limitations of areas in which the communication services can be provided.

Meanwhile, satellite communication technology is regarded as the only means capable of providing a communication service to special mobile objects, such as high-speed mobile objects and ships, as well as regions that cannot be connected via a ground network using a very small aperture terminal (VSAT) requiring small capacity and low power, and associated research is actively ongoing. In particular, since a satellite communication system enables construction of a global service infrastructure and can provide a high-quality communication service, work for building a system that supports a ubiquitous network environment using the satellite communication technology is under way.

In a bidirectional satellite communication system, broadcasting and communication data transmission from a central station to a satellite terminal device (or terminal station) is performed through a forward link according to a Digital Video Broadcasting via Satellite (DVB-S) standard, and broadcasting and communication data transmission from the satellite terminal device to the central station is performed through a return link according to a DVB-Return Channel via Satellite (RCS) standard.

Lately, universalization of Internet services based on satellite networks is requiring technology for a satellite terminal device to provide high-quality service through a highly efficient return link. Standardization relating to this technology is currently being completed. As an encapsulation technique, there is a method of determining a packet error of a satellite return link using cyclic redundancy check (CRC) or packet sequence number information and reassembling a packet.

In U.S. Patent Publication No. 2008-0175247 (title of the invention: Network layer error control systems and methods), a network layer error control method is disclosed in which a predetermined device generates an error control header for a received packet, encapsulates the generated error control header to transmit the error control header at the network layer, and then transmits the encapsulated error control header, and a device receiving the transmitted error control header processes the error control header and analyzes error control information.

However, hitherto proposed return link techniques show low transmission efficiency, or process normally received subsequent packets as loss in a burst error transmission environment.

SUMMARY

Accordingly, example embodiments of the present invention are provided to substantially obviate one or more problems due to limitations and disadvantages of the related art.

Example embodiments of the present invention provide a return link packet error detection method in a satellite communication system whereby loss of a packet transmitted through a return link of the satellite communication system can be minimized.

In some example embodiments, a method of detecting a packet error of a return link performed in a satellite communication apparatus receiving a packet through the return link includes: generating a first return link packet combination by assembling at least one fragmented packet received through the return link; and determining an error of the packet using at least one piece of information among fragmentation information on at least one second return link packet received after the first return link packet combination is generated, whether or not the first return link packet combination is complete, and packet process state information.

Here, determining an error of the packet may include, when the first return link packet combination is not complete and the second return link packet is an intermediate packet or an end packet, determining whether or not there is a packet error on the basis of a comparison result between a length of a combination of the first return link packet combination and the second return link packet and a total length acquired from the first return link packet combination.

Here, determining an error of the packet may include, when the first return link packet combination is not complete, the second return link packet is an intermediate packet, and the length of the combination of the first return link packet combination and the second return link packet is greater than the total length, removing the first return link packet combination and the second return link packet.

Here, determining an error of the packet may include, when the first return link packet combination is not complete, the second return link packet is an end packet, the length of the combination of the first return link packet combination and the second return link packet is the same as the total length, and a sequence number of a subsequent packet acquired from the first return link packet combination is the same as a sequence number of the second return link packet, determining that there is no error in the second return link packet, and when the first return link packet combination is not complete, the second return link packet is an end packet, and the length of the combination of the first return link packet combination and the second return link packet is not the same as the total length, or the sequence number of the subsequent packet acquired from the first return link packet combination is not the same as the sequence number of the second return link packet, removing the first return link packet combination and the second return link packet.

Here, determining an error of the packet may include, when the first return link packet combination is not complete and the second return link packet is a start packet or a non-fragmented packet, removing the first return link packet combination, determining that no error occurs in the second return link packet, and then updating sequence number information on a packet to be received after the second return link packet.

Here, determining an error of the packet may include, when only an intermediate packet is included in the first return link packet combination, storing an intermediate packet process state as the packet process state information, and removing the intermediate packet.

Here, determining an error of the packet may include, when the second return link packet received after the intermediate packet is removed is a start packet, checking from the packet process state information that the intermediate packet has been removed, and updating a sequence number of a packet to be received.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
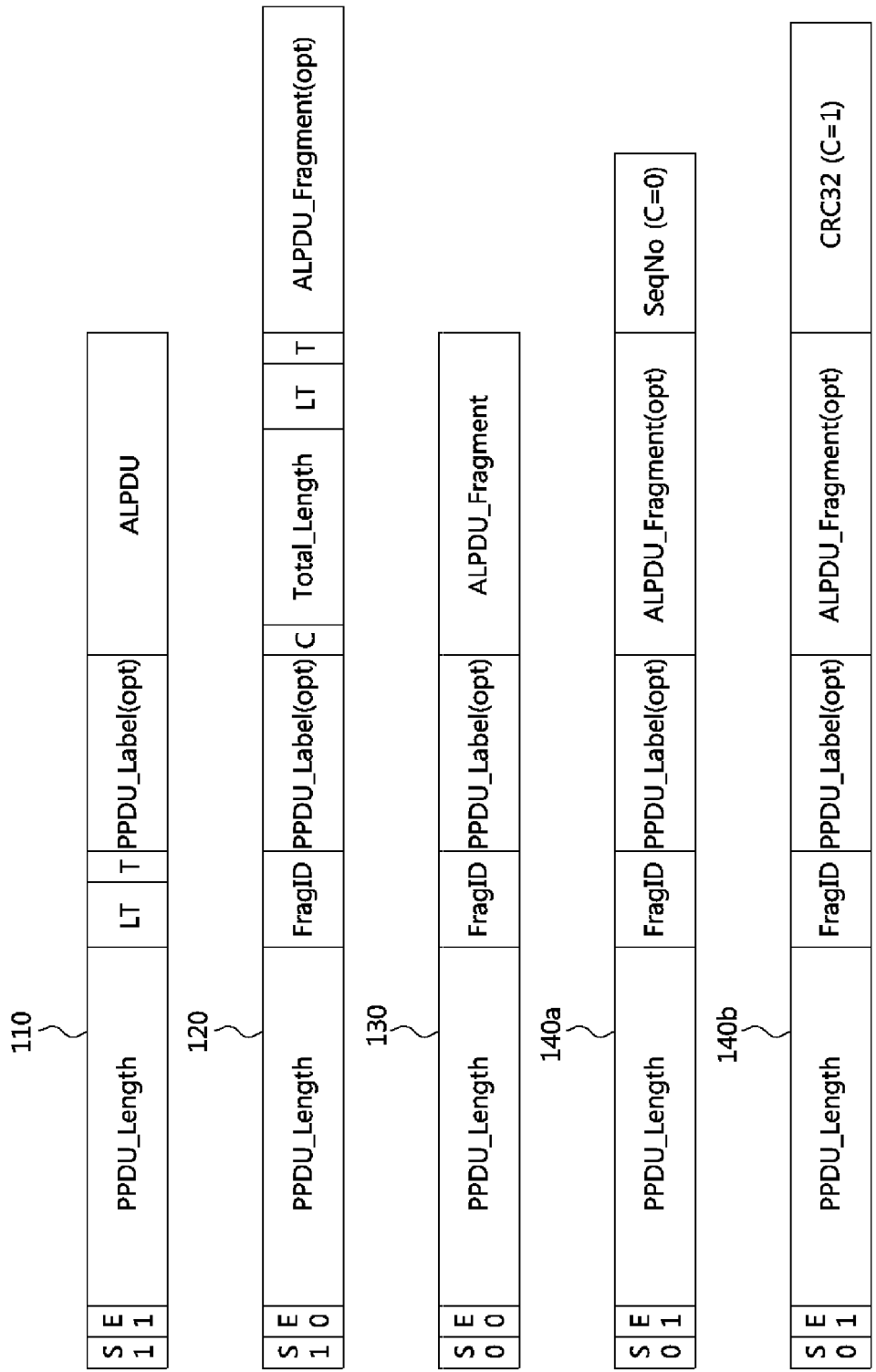
FIG. 1 shows type-specific structures of return link packets transmitted through a return link in a satellite communication system.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the appended drawings. To aid in understanding the present invention, like numbers refer to like elements throughout the description of the figures, and the description of the same component will not be reiterated.

FIG. 1 shows type-specific structures of return link packets transmitted through a return link in a satellite communication system.

Referring to FIG. 1, return link packets transmitted through a return link in a satellite communication system include non-fragmented packets and fragmented packets. Fragmented packets may include a start packet, an intermediate packet, and an end packet. Here, a satellite terminal device may transmit non-fragmented packets, or may fragment a packet and then transmit the fragmented packets. When a return link packet is fragmented and transmitted, one set of a start packet, an intermediate packet and an end packet are transmitted in sequence as long as there is no loss in the transmission process.

All types of return link packets include a 2-bit start (S) field and a 2-bit end (E) field representing the types of return link packets, and a payload adapted protocol data unit (PPDU) length (PPDU_Length) field indicating a length of a variable length portion of a PPDU. The start (S) and end (E) fields represent fragmentation information on a return link packet. Specifically, S=1 and E=1 represent a non-fragmented return link packet 110, and S=1 and E=0 represent a start packet 120 among fragmented return link packets. Also, S=0 and E=0 represent an intermediate packet 130 among fragmented return link packets, and S=0 and E=1 represent end packets 141 and 140b among fragmented return link packets.

The non-fragmented return link packet 110 includes a 2-bit label type (LT) field indicating a label type of an address linked PDU (ALPDU) and a 1-bit T field representing a protocol type suppression type flag, and the fragmented return link packets 120, 130, 140*a* and 140*b* include a 3-bit fragment identifier (FragID) field.

Also, all the types of return link packets may selectively include a PPDU label (PPDU_Label) field for defining a fragment switching label. Among the fragmented packets, the start packet 120 and the end packets 140*a* and 140*b* may selectively include an ALPDU section (ALPDU_Fragment), but the intermediate packet 130 includes the ALPDU section (ALPDU_Fragment).

The start packet 120 includes a total length (Total_Length) field indicating a length of a whole packet before fragmentation. In a reassembly process of return link packets in a method of detecting a packet error of a return link according to an example embodiment of the present invention, the total length (Total_Length) information is used as a reference for detecting a reassembly error. For example, although an end packet is received among return link packets and reassembled, a total packet length may be less or greater than a length defined in the total length field. This case indicates that an error has occurred in the reassembly process.

Also, the start packet 120 includes a 1-bit C field indicating whether an ALPDU sequence number field or an ALPDU cyclic redundancy check (CRC) field is included in the end packets 140*a* and 140*b*. For example, the C field that is set to 1 indicates that an ALPDU CRC field is used in an end packet (e.g., 140*b*), and the C field that is set to 0 indicates that an ALPDU sequence number field is used in an end packet (e.g., 140*a*).

Meanwhile, the end packets 140*a* and 140*b* include a sequence number (SeqNo) field or a CRC field. Sequence number information included in the sequence number (SeqNo) field is used for detecting a reassembly error of return link packets in a method of detecting a packet error of a return link according to an example embodiment of the present invention. For example, a satellite terminal device sets a sequence number field value of an end packet using a value of change in sequence number information on a subsequent packet during packet fragmentation and then transmits the end packet, and a central station that receives a return link packet compares the sequence number information included in the received end packet with sequence number information on the subsequent packet and determines that there is no error in reassembly of the return link packet when the sequence number information on the subsequent packet is the same as the sequence number information on the currently received end packet.

Figure 2:
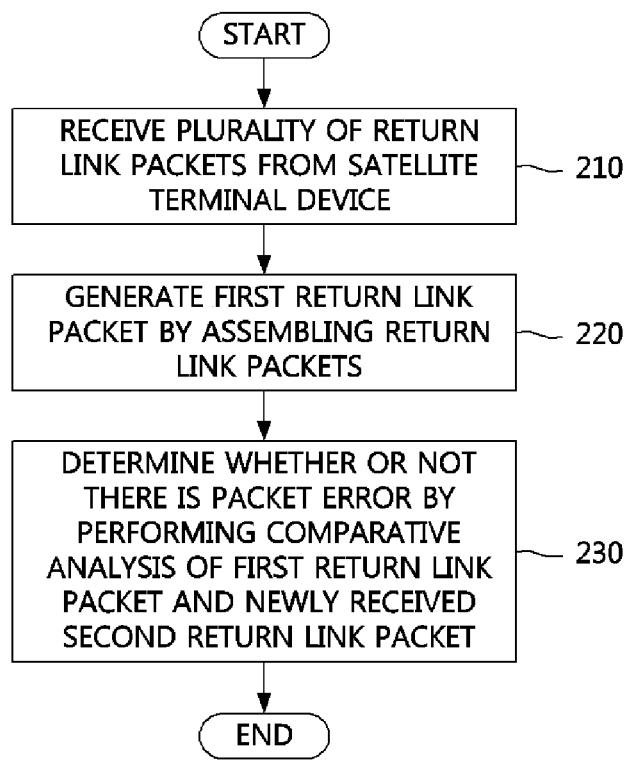
FIG. 2 is a flowchart illustrating a method of detecting a packet error of a return link in a satellite communication system according to an example embodiment of the present invention.

FIG. 2 is a flowchart illustrating a method of detecting a packet error of a return link in a satellite communication system according to an example embodiment of the present invention. The method of detecting a packet error of a return link illustrated in FIG. 2 can be performed in a central station that receives a plurality of packets transmitted from a satellite terminal device (or terminal station) through the return link.

Referring to FIG. 2, a central station receives a plurality of return link packets from a satellite terminal device (step 210). In a bidirectional satellite communication system, broadcasting and/or communication data transmission from a central station to a satellite terminal device (or terminal station) is performed through a forward link according to a Digital Video Broadcasting via Satellite (DVB-S) standard, and broadcasting and/or communication data transmission from the satellite terminal device (or terminal station) to the central station is performed through a return link according to a DVB-Return Channel via Satellite (RCS) standard. Thus, the satellite terminal device transmits the plurality of packets through a return link, and the central station receives the packets.

As illustrated in FIG. 1, one return link packet may be fragmented into a plurality of packets by the satellite terminal device, and then the fragmented packets may be transmitted in sequence. For example, the return link packet may be fragmented into a start packet, an intermediate packet and an end packet, and then sequentially transmitted from the satellite terminal device to the central station through the return link. Among the return link packets, the end packet includes sequence number information on the packet before fragmentation.

The central station generates a first return link packet by assembling the received return link packets (step 220). Here, the first return link packet denotes an assembly-resultant packet, and two or more return link packets may be assembled. The first return link packet may be in the form of a complete packet in which a start packet, an intermediate packet and an end packet are assembled, or in the form of an incomplete packet in which a start packet, an intermediate packet and an end packet are not assembled. Also, the central station may generate the first return link packet by sequentially assembling the received return link packets.

Subsequently, the central station performs comparative analysis of a second return link packet received next to the first return link packet, thereby determining whether or not there is an error in the packet combination (step 230).

At this time, the central station may compare the first return link packet with the second return link packet and analyze the first return link packet and the second return link packet using total length (Total_Length) information included in a header of the first return link packet and/or the second return link packet, thereby determining whether or not there is an error in the packet combination. In other words, an error of the packet combination can be determined by comparing the sum of a length of the first return link packet and a length of the second return link packet with the total length (Total_Length) information included in a start packet header of each return link packet.

Also, the central station may determine an error of the packet combination by performing comparative analysis of presence or absence of the first return link packet and fragmentation information on the second return link packet. Here, presence or absence of the first return link packet denotes whether the received return link packets have been assembled in order of a start packet, an intermediate packet and an end packet. In other words, presence of the first return link packet denotes that a combination of the first return link packet is not complete, and absence of the first return link packet denotes that a combination of the first return link packet is complete, or only an intermediate packet has been in the first return link packet and thus has been removed. When there is no first return link packet, the second return link packet should be a start packet. When the second return link packet is not a start packet but is an intermediate packet or an end packet, the second return link packet is determined as an error.

When an end packet is included in the first return link packet, the central station checks sequence number (SeqNo) information included in the end packet and sequence number information on a subsequent packet, thereby determining whether or not there is an error in the packet. When the second return link packet is an end packet, the central station compares sequence number information on the first return link packet with sequence number information included in the end packet of the second return link packet, thereby determining whether or not there is an error in the packet. In other words, when the sequence number of the received first return link packet and the sequence number of the second return link packet do not continue in sequence according to sequence number information sequentially set when the satellite terminal device fragments the packet, the central station determines the first return link packet and/or the second return link packet as an error.

Figure 3:
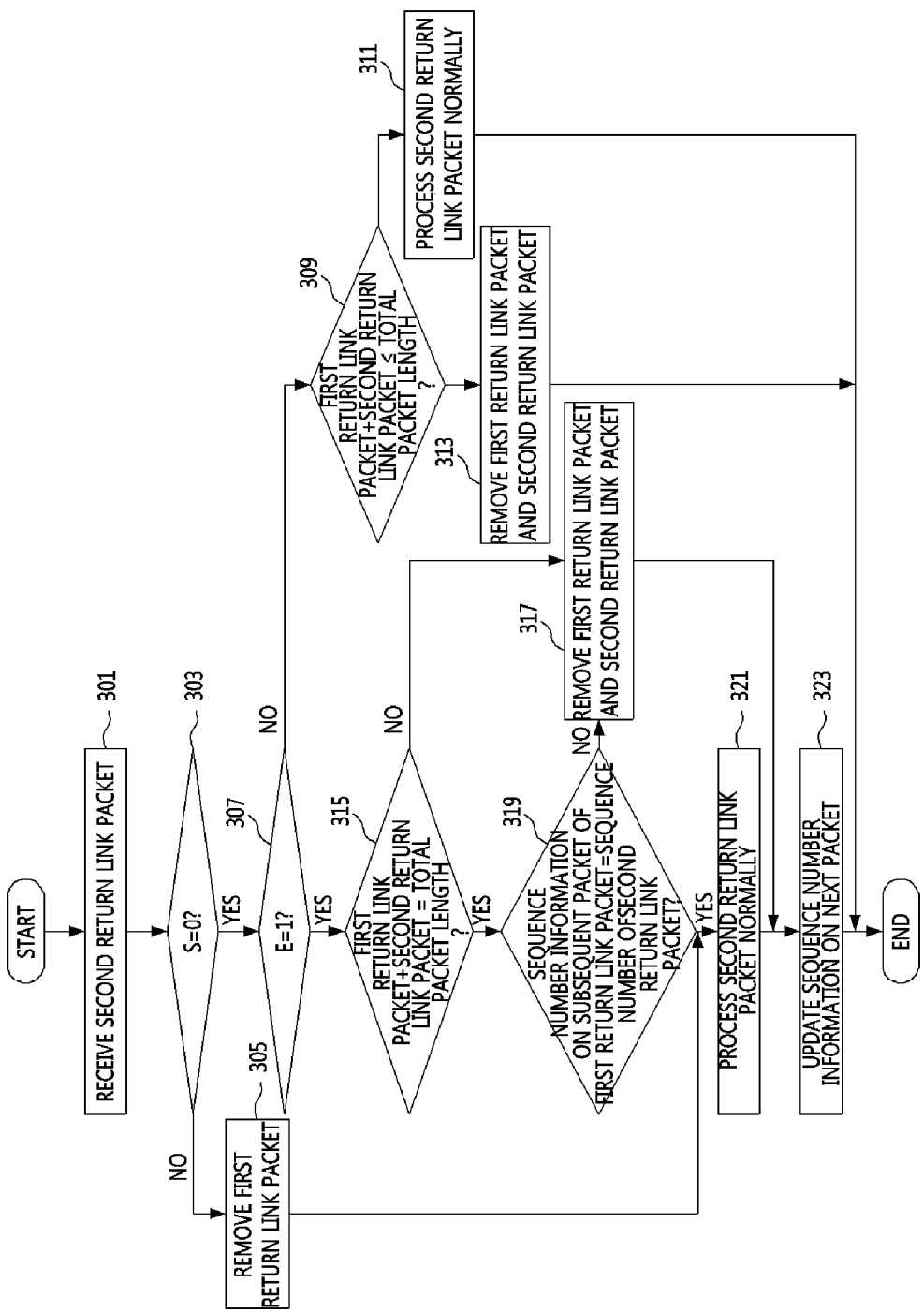
FIG. 3 is a flowchart illustrating a packet error determination process shown in FIG. 2 in further detail.

FIG. 3 is a flowchart illustrating a packet error determination process shown in FIG. 2 in further detail, specifically, a packet error determination and packet reassembly process for a case in which there is a first return link packet.

Referring to FIG. 3, in a condition that there is the first return link packet generated through step 220 illustrated in FIG. 2, the central station receives a second return link packet that is a subsequent packet (step 301), and analyzes the received second return link packet as follows.

First, the central station checks a start (S) field of the second return link packet to determine whether a start (S) bit is 0 (i.e., S=0) (step 303). When it is determined that the start (S) bit is 1 (i.e., S=1), the central station removes the generated first return link packet (step 305). The start (S) bit of 1 (S=1) denotes that the second return link packet is a non-fragmented packet or a start packet.

When there is the first return link packet, the whole packet has not yet been assembled, and thus the second return link packet should be an intermediate packet or an end packet. For this reason, when a start packet or a non-fragmented packet is input as the second return link packet, the central station removes the first return link packet. In other words, the central station determines that an intermediate packet or an end packet, which is the second return link packet to be assembled with the first return link packet, has been lost. However, when the start bit is 1, the second return link packet is a start packet or a non-fragmented packet, and there is no problem in generating the second return link packet. Thus, the central station processes the second return link packet as having been received normally (step 321).

When it is determined in step 303 that the start bit is 0 (i.e., S=0), the central station checks an end (E) field to determine whether an end (E) bit is 1 (i.e., E=1) (step 307). When the start bit is 0 and the end bit is 0 (i.e., S=0 and E=0), the second return link packet is an intermediate packet. When the start bit is 0 and the end bit is 1 (i.e., S=0 and E=1), the second return link packet is an end packet.

When it is determined in step 307 that the end bit is 0 (i.e., S=0 and E=0), the central station determines whether a length of a combination packet of the first return link packet and the second return link packet is equal to or less than the total length (Total_Length), which is information included in the start packet of the first return link packet (step 309). When the start bit is 0 and the end bit is 0 (i.e., S=0 and E=0), the second return link packet is an intermediate packet, and thus the length of the combination of the first return link packet and the second return link packet should be equal to or less than a total length of a completely assembled packet. Thus, when the length of the combination is equal to or less than the total length (Total_Length), the central station processes both the first return link packet and the second return link packet normally (step 311). In other words, the central station determines that no error has occurred in the combination of the first return link packet and the second return link packet.

On the other hand, when it is determined in step 309 that the length of the combination of the first return link packet and the second return link packet is greater than the total length, an error has occurred in the combination of the first return link packet and the second return link packet, and thus the central station removes both the first return link packet and the second return link packet (step 313).

Meanwhile, when it is determined in step 307 that the end bit is 1 (i.e., S=0 and E=1), the central station determines whether the length of the combination of the first return link packet and the second return link packet is the same as the total length (step 315). In other words, when the start bit is 0 and the end bit is 1, the second return link packet is an end packet, and thus the length of the combination packet of the first return link packet and the second return link packet should be the same as the length of the whole packet.

For this reason, when the length of the combination packet of the first return link packet and the second return link packet is not the same as the total packet length, the central station removes both the first return link packet and the second return link packet (step 317). This denotes that an error has occurred in a process of assembling the first return link packet and the second return link packet.

Meanwhile, when it is determined in step 315 that the length of the combination of the first return link packet and the second return link packet is the same as the total length, the central station determines whether sequence number information on a subsequent packet of the first return link packet is the same as sequence number information on the second return link packet (step 319).

When it is determined in step 319 that the sequence number information on the subsequent packet of the first return link packet is the same as the sequence number information on the second return link packet, the central station processes the second return link packet as having been received normally (step 321).

After the second return link packet is processed normally in step 311 and step 321, or the first return link packet and/or the second return link packet are removed through step 305, 313 or 317, the central station updates sequence number information on a packet to be received next (step 323). At this time, the central station may store the updated sequence number information in a storage prepared therein. When a new start packet is received while the first return link packet is assembled, the sequence number of the subsequent packet is increased by 1, or the sequence number information on the subsequent packet is updated using the sequence number information included in the end packet of the received second return link packet. Thus, when a new packet is received thereafter, the sequence number of the packet updated on the basis of the previously received packet is compared with sequence number information included in an end packet of the currently received packet. When the sequence number of the packet updated on the basis of the previously received packet is the same as the sequence number information included in the end packet of the currently received packet, it is possible to determine that there is no error in the combination of the first return link packet and the second return link packet.

Figure 4:
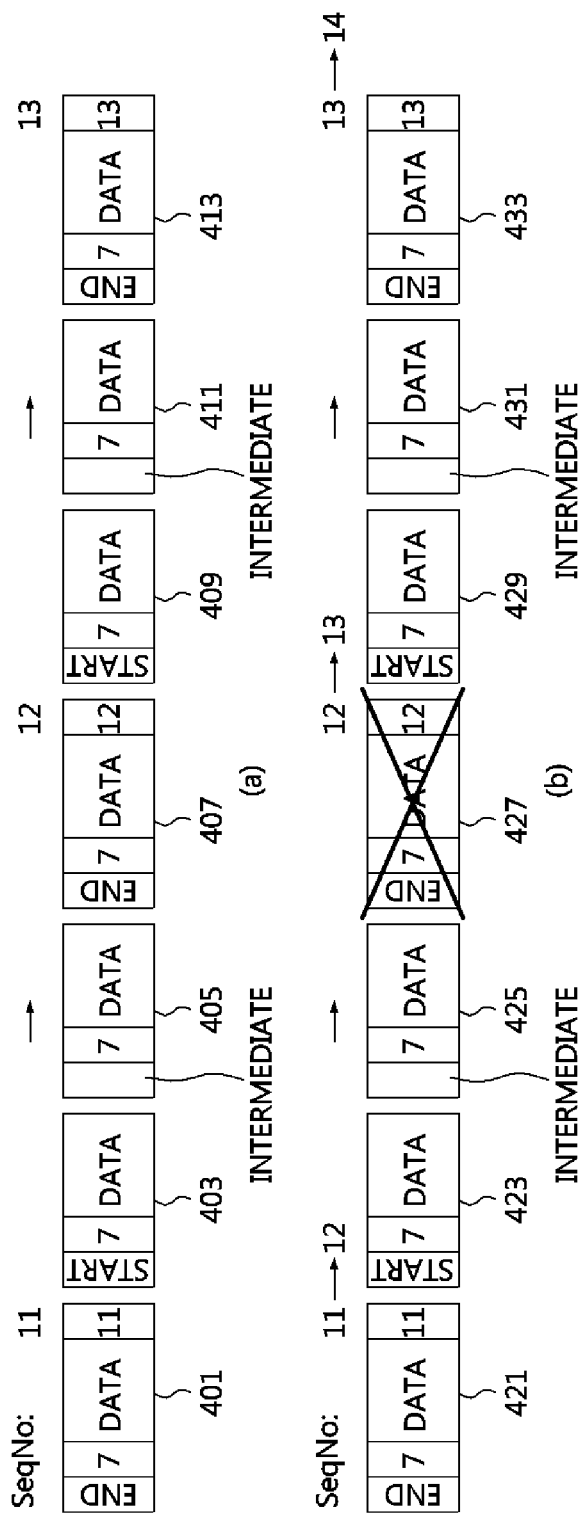
FIG. 4 is a conceptual diagram illustrating a process of determining a packet error using sequence number information on a return link packet illustrated in FIG. 3.

FIG. 4 is a conceptual diagram illustrating a process of determining a packet error using sequence number information on a return link packet illustrated in FIG. 3. (a) of FIG. 4 illustrates a case in which there is no error in a packet combination, and (b) of FIG. 4 illustrates a case in which there is an error in a packet combination.

Referring to (a) of FIG. 4, the leftmost packet is an end packet 401 and includes sequence number information "11" in a sequence number (SeqNo) field. In other words, the sequence number information included in the end packet 401 indicates that a number of the current packet is 11, and a number of a packet to be received next is 12.

After the end packet 401, a start packet 403, an intermediate packet 405 and an end packet 407 are fragmentarily received in sequence. In this case, sequence number information included in the second end packet 407 is 12, and thus it is possible to know that the packets have been received normally. Here, the sequence number information included in the second end packet 407 indicates that a number of a packet to be received next is 13.

After the second end packet 407, a start packet 409, an intermediate packet 411 and an end packet 413 are fragmentarily received, and sequence number information "13" is included in a sequence number field of the third end packet 413. Thus, it is possible to know that a packet having the sequence number estimated from the second end packet 407 has been received, and no error has occurred in a combination of these return link packets.

Meanwhile, referring to (b) of FIG. 4, the leftmost packet is a first end packet 421 that is received the earliest and has sequence number (SeqNo) information "11," which indicates that sequence number information on a packet to be received next is 12. After the first end packet 421, a start packet 423 and an intermediate packet 425 are received and then assembled to generate a first return link packet. After the first return link packet is generated, a start packet 429, an intermediate packet 431 and an end packet 433 that are new subsequent return link packets are received in sequence and constitute a second return link packet.

When the return link packets are received as shown in (b) of FIG. 4, a second end packet 427 has been lost, but a sequence number of the subsequent packet is updated with 13 by the start packet 429 received after the second end packet 427. Thus, the first return link packets 423 and 425 are processed as having been lost, but the second return link packets 429, 431 and 433 are assembled normally.

Figure 5:
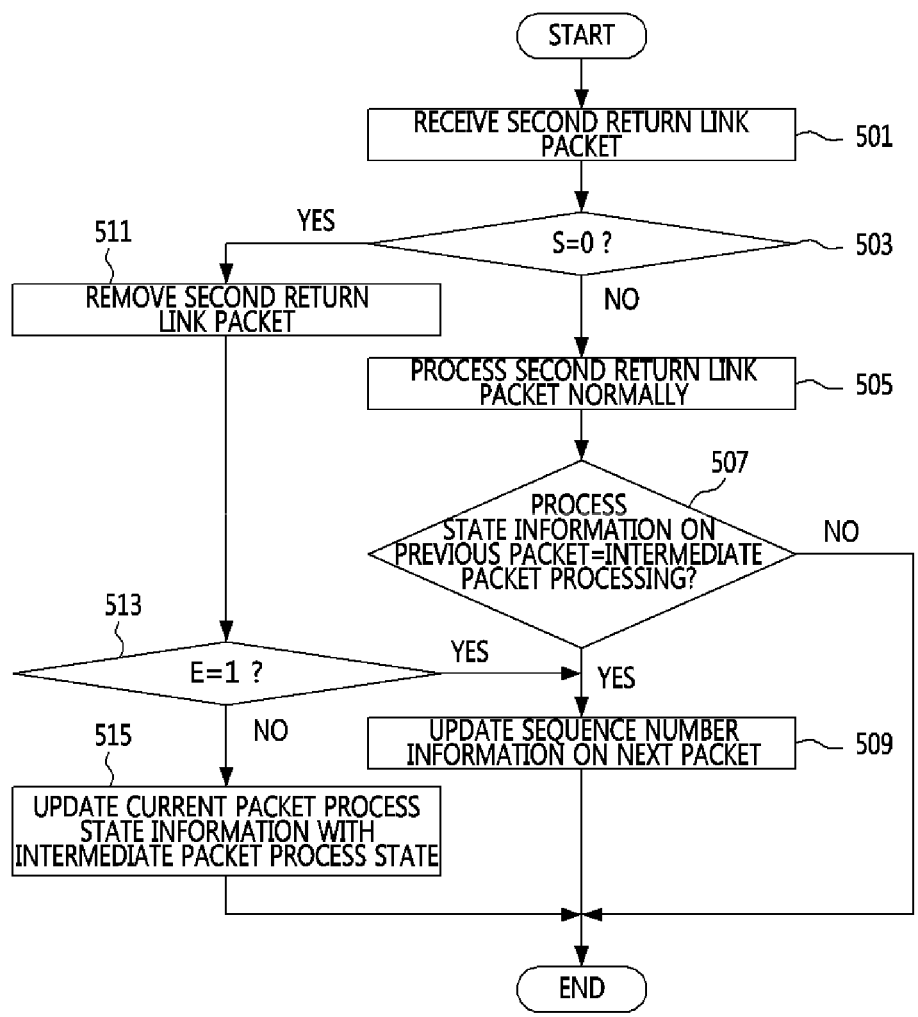
FIG. 5 is a flowchart illustrating a packet error determination process shown in FIG. 2 in further detail.

FIG. 5 is a flowchart illustrating a packet error determination process shown in FIG. 2 in further detail, specifically, a packet error determination and packet reassembly process for a case in which there is no first return link packet. Here, the case in which there is no first return link packet may denote that a combination of received first return link packets has been completed, or a first return link packet has been removed in a packet reassembly process.

Referring to FIG. 5, in a condition that there is no first return link packet that is being assembled, the central station receives a second return link packet (step 501), and performs a packet error determination and packet reassembly process of the received second return link packet as will be described below.

First, the central station determines whether a start bit of the received second return link packet is 0 (i.e., S=0) (step 503). Here, the start bit of 0 denotes that the received second return link packet is an intermediate packet or an end packet, and the start bit of 1 denotes that the received second return link packet is a non-fragmented packet or a start packet.

When it is determined in step 503 that the start bit is not 0 (i.e., S=1), the central station determines that the second return link packet has been received normally, and processes the second return link packet normally (step 505).

Subsequently, the central station checks whether a packet (e.g., a removed first return link packet) which has been received immediately before the packet having the start bit of 1 is an intermediate packet (step 507). When the packet is an intermediate packet, the central station updates a sequence number of a subsequent return link packet (step 509), and when the packet is not an intermediate packet, the central station does not update the sequence number information.

On the other hand, when it is determined in step 503 that the start bit is 0 (i.e., S=0), the received second return link packet is an intermediate packet or an end packet. Thus, the central station determines that a part of a packet is lost, and removes the received second return link packet (step 511).

Subsequently, the central station determines whether an end bit is 1 (i.e., E=1) (step 513). When it is determined that the end bit is 1, the central station updates sequence number information on the next return link packet (step 509).

On the other hand, when it is determined in step 513 that the end bit is 0, the second return link packet received in step 501 is an intermediate packet. Thus, the central station stores packet process state information indicating that a type of the currently processed packet is an intermediate packet such that the sequence number information can be updated by a start packet which may be input next (step 515).

Figure 6:
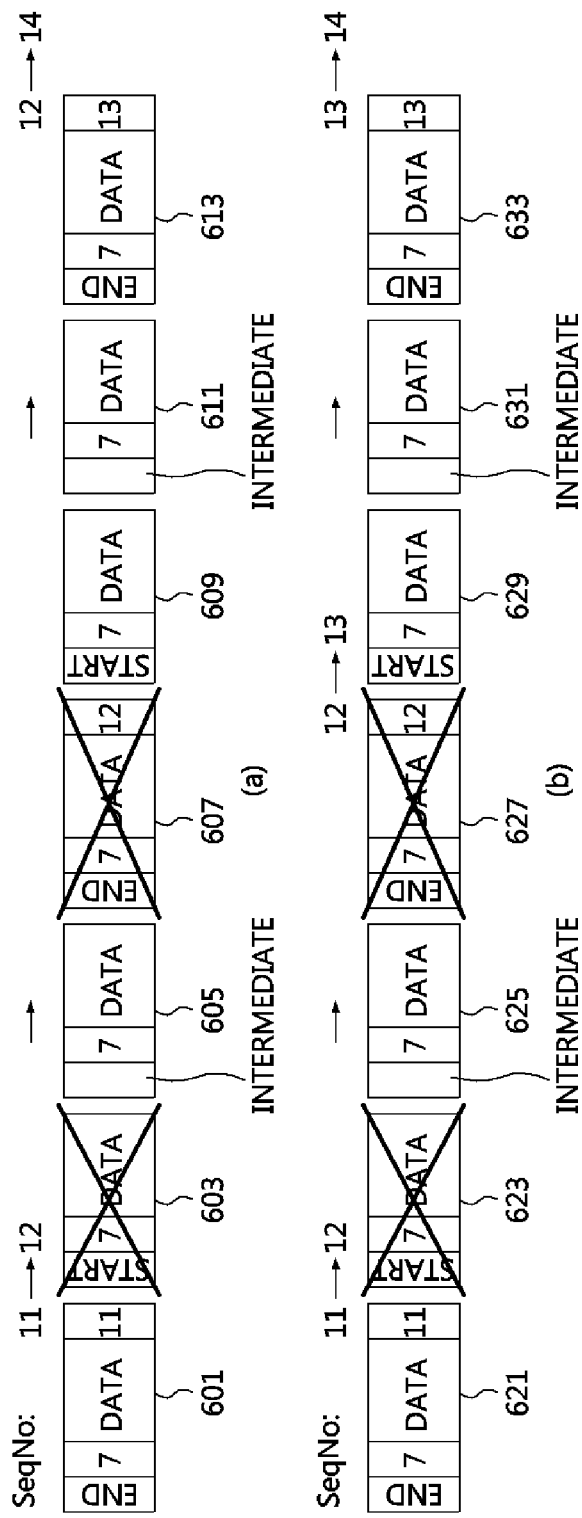
FIG. 6 is a conceptual diagram illustrating a process of determining an error of a packet combination using packet process state information illustrated in FIG. 5.

FIG. 6 is a conceptual diagram illustrating a process of determining an error of a packet combination using packet process state information illustrated in FIG. 5. (a) of FIG. 6 illustrates a case in which there is no error in a packet combination, and (b) of FIG. 6 illustrates a case in which there is an error in a packet combination.

Referring to (a) of FIG. 6, the leftmost packet is a first end packet 601 which is received the earliest and includes sequence number information "11" in a sequence number field. In other words, the sequence number information included in the first end packet 601 indicates that a number of the current packet is 11, and a sequence number of a packet to be received next is 12.

Subsequently, among a start packet 603, an intermediate packet 605 and an end packet 607 which are return link packets, the start packet 603 and the end packet 607 are lost, and only the intermediate packet 605 is received. Thus, a first return link packet is not generated. As second return link packets that are new return link packets received after the intermediate packet 605, a start packet 609, an intermediate packet 611 and an end packet 613 are received in sequence.

When the return link packets are received as described above, sequence number information on the received second end packet 613 indicates 13, which is different from 12, the sequence number information on the subsequent packet determined on the basis of the received first end packet 601. Thus, in an existing packet error determination method, an error would be considered to have occurred in the packet combination, and the second return link packets 609, 611 and 613 would be removed even when these packets were received normally.

However, in a packet error detection method according to an example embodiment of the present invention, as shown in (b) of FIG. 6, information indicating that an intermediate packet 625 has been received for a first return link packet of which a start packet 623 and an end packet 627 have been lost is stored as packet process state information, and when a start packet 629 is received thereafter, sequence number information on a subsequent packet is updated with 13. Thus, sequence number information "13" of normally received second return link packets is the same as the updated sequence number information "13" on the subsequent packet, and the second return link packets 629, 631 and 633 are not removed but assembled normally.

As illustrated in FIG. 5 and FIG. 6, in a method of detecting a packet error of a return link according to an example embodiment of the present invention, when at least one intermediate packet is received as a first return link packet, packet process state information is stored, and when a start packet of a second return link packet is received thereafter, sequence number information on a subsequent packet is updated. Thus, it is possible to prevent the normally received second return link packet from being removed, and thereby packet reassembly performance can be improved.

In the above-described method of detecting a return link packet error in a satellite communication system, whether or not there is an error in a packet transmitted from a satellite terminal device through a return link can be determined using sequence number information on the packet and packet process state information, and the received packet is reassembled on the basis of the determination result. Consequently, it is possible to minimize packet loss caused by a reassembly error of the received packet.

While example embodiments of the present invention and their advantages have been described in detail, it should be understood that various changes, substitutions and alterations may be made herein without departing from the scope of the invention.

What is claimed is:

1. A method of detecting packet error of a return link performed in a satellite communication apparatus receiving packets through the return link, comprising:
    generating a first return link packet combination by assembling at least one fragmented packet received through the return link; and
    determining if there is an error of the first return link packet combination using at least one of fragmentation information on at least one second return link packet received after the first return link packet combination is generated and packet process state information, wherein the error of the first return link packet combination is determined when the first return link packet combination is complete and when the first return link packet combination is not complete.

2. The method of claim 1, further comprising:
    when the first return link packet combination is not complete and the second return link packet is an intermediate packet or an end packet, determining if there is the error of the first return link packet combination on the basis of a comparison result between a length of a combination of the first return link packet combination and the second return link packet and a total length acquired from the first return link packet combination.

3. The method of claim 2, further comprising:
    when the first return link packet combination is not complete, the second return link packet is an intermediate packet, and the length of the combination of the first return link packet combination and the second return link packet is greater than the total length, removing the first return link packet combination and the second return link packet.

4. The method of claim 2, further comprising:
    when the first return link packet combination is not complete, the second return link packet is an end packet, the length of the combination of the first return link packet combination and the second return link packet is the same as the total length, and a sequence number of a subsequent packet acquired from the first return link packet combination is the same as a sequence number of the second return link packet, determining that there is no error in the second return link packet, and
    when the first return link packet combination is not complete, the second return link packet is an end packet, and the length of the combination of the first return link packet combination and the second return link packet is not the same as the total length, or the sequence number of the subsequent packet acquired from the first return link packet combination is not the same as the sequence number of the second return link packet, removing the first return link packet combination and the second return link packet.

5. The method of claim 2, further comprising:
    when the first return link packet combination is not complete, and the second return link packet is a start packet or a non-fragmented packet, removing the first return link packet combination;
    determining that no error has occurred in the second return link packet and
    updating sequence number information on another packet to be received after the second return link packet.

6. The method of claim 1, further comprising:
    when only an intermediate packet is included in the first return link packet combination, storing an intermediate packet process state as the packet process state information, and removing the intermediate packet.

7. The method of claim 6, further comprising:
    when the second return link packet received after the intermediate packet is removed is a start packet, checking from the packet process state information that the intermediate packet has been removed, and updating a sequence number of another packet to be received.

* * * * *